United States Patent [19]

Smith et al.

[11] 4,235,854

[45] Nov. 25, 1980

[54] METHOD FOR PURIFYING WET PROCESS PHOSPHORIC ACID

[75] Inventors: Hudson C. Smith; Wesley W. Atwood; John S. Myrick, all of Lake City, Fla.

[73] Assignee: Occidental Petroleum Corp., Los Angeles, Calif.

[21] Appl. No.: 827,741

[22] Filed: Aug. 25, 1977

Related U.S. Application Data

[63] Continuation of Ser. No. 744,229, Nov. 23, 1976, abandoned, which is a continuation of Ser. No. 571,855, Apr. 25, 1975, abandoned.

[51] Int. Cl.² .............................................. C01B 25/16
[52] U.S. Cl. .................................... 423/320; 423/319; 423/321 R
[58] Field of Search ................. 423/319, 320, 321 R, 423/371 S; 210/35, 77, 193, 402

[56] References Cited

U.S. PATENT DOCUMENTS

| | | | |
|---|---|---|---|
| 2,123,785 | 3/1938 | Knox et al. | 423/321 |
| 2,308,716 | 1/1943 | DeQua | 210/75 |
| 2,415,797 | 2/1947 | Low | 423/321 |
| 2,917,367 | 12/1959 | Hodges et al. | 423/321 |
| 3,328,123 | 6/1967 | Parks et al. | 423/321 |
| 3,338,675 | 8/1967 | Gilbert et al. | 423/321 |
| 3,494,736 | 2/1970 | Carothers et al. | 423/321 R |
| 3,505,013 | 4/1970 | Araki et al. | 423/321 R |
| 3,554,694 | 1/1971 | Barker et al. | 423/321 R |
| 3,642,439 | 2/1972 | Moore et al. | 423/321 |
| 4,048,289 | 9/1977 | Pierres | 423/321 R |

FOREIGN PATENT DOCUMENTS 915389 11/1972 Canada .................................... 423/320

OTHER PUBLICATIONS

Perry's Chem. Engr. Handbock-Perry-1960, pp. 19–60, 19–78, 19–79.
Filtration-Filter Aids-Wheeler-Jan./Feb. 1964, pp. 41–43.
Phosphoric Acid-PtII ∝ Slack-p. 691.

*Primary Examiner*—Wayne A. Langel
*Attorney, Agent, or Firm*—Barry A. Bisson

[57] ABSTRACT

A method for removing impurities from wet process produced phosphoric acid and recovering phosphate values retained by the impurities is disclosed. The wet process produced phosphoric acid is filtered through a diatomite filter cake in a porous medium at a temperature from about 57° C. to about 77° C. During filtering an impurity-containing upper portion of the filter cake is removed exposing a fresh surface of the filter cake. An aqueous slurry is formed with the removed portion of filter cake. The slurry is filtered to recover a filtrate containing a major portion of the phosphate values retained by the removed portion of the filter cake.

13 Claims, 1 Drawing Figure

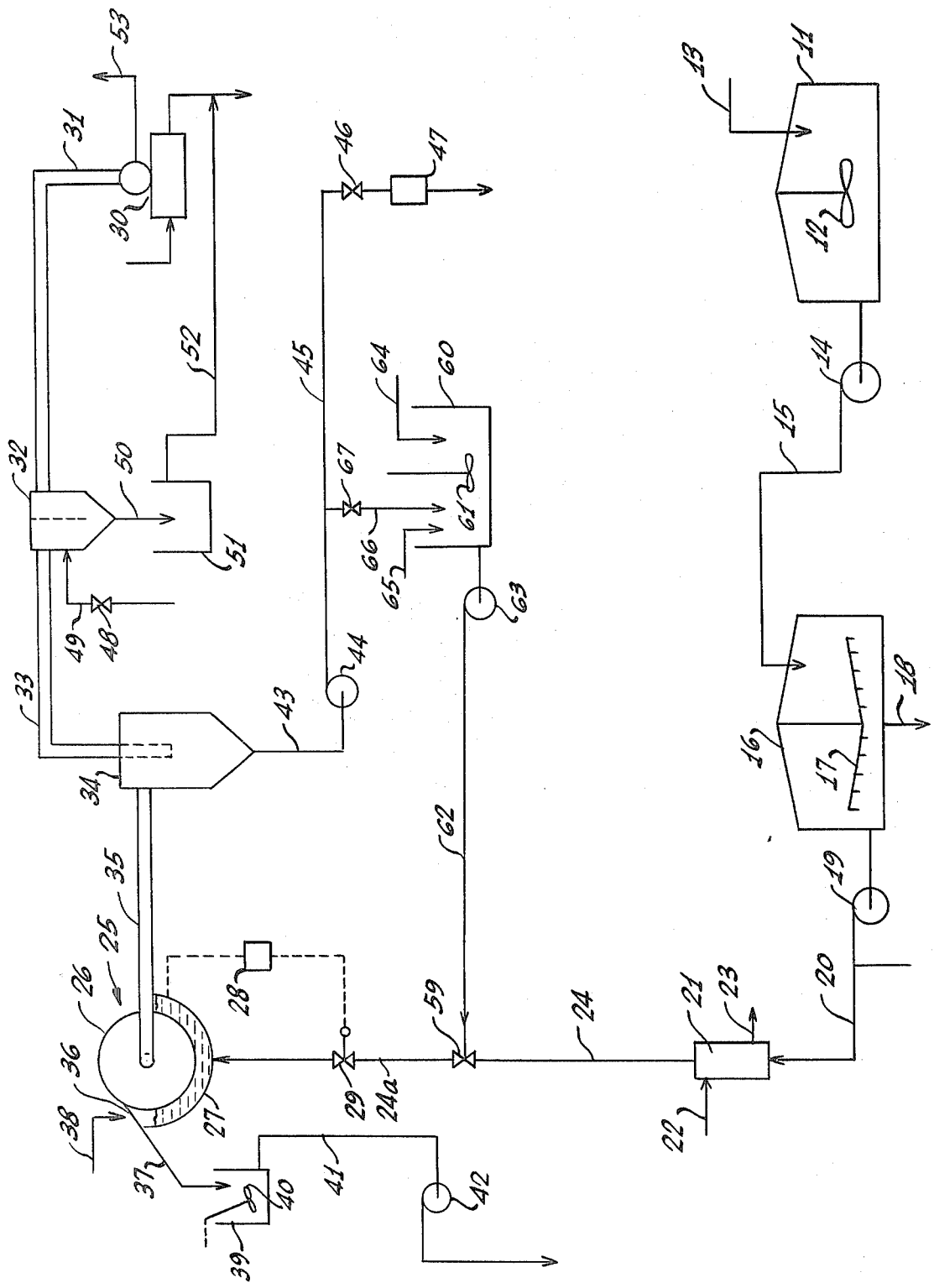

METHOD FOR PURIFYING WET PROCESS PHOSPHORIC ACID

This application is a continuation of application Ser. No. 744,229, filed Nov. 23, 1976, now abandoned, which is a continuation of application Ser. No. 571,855, filed Apr. 25, 1975, now abandoned.

BACKGROUND OF THE INVENTION

This invention relates to wet process manufactured phosphoric acid and more particularly to a method for purifying wet process manufactured phosphoric acid.

The bulk of phosphoric acid is produced by the so-called wet process method. Although there are a wide variety of wet process methods, they all basically comprise the acidulation of phosphate bearing rock with sulfuric acid which results in the precipitation of calcium sulfate and the release of crude phosphoric acid. The crude acid thus produced contains from 22 to 34 percent phosphate and is subsequently concentrated by evaporation to a phosphate content of about 50%. The concentrated crude phosphoric acid is subsequently utilized in the production of fertilizers or is subsequently treated to produce high grade phosphoric acid or other phosphates.

The crude phosphoric acid is relatively high in impurities including aluminum, magnesium and iron complexes. These impurities, which are suspended in the crude acid solution, are not normally removed during the acid manufacturing process, nor are they removed by holding the crude acid in a setting tank for a commercially reasonable time, i.e., on the order of 48 to 60 hours. Consequently, the impurities are encountered in the form of a sludge in the bottom of a tank car after shipping the acid from the manufacturing site to the customer's location. The presence of this sludge often results in the rejection of the shipment by the customer or in the loss of a substantial portion of the crude acid when decantation of the clear acid is attempted.

In addition to the above impurities, crude acid contains substantial proportions of fluorine. The presence of fluorine is considered undesirable, particularly if the phosphoric acid is to be used for purposes other than in the production of fertilizer.

Present methods for purifying the crude phosphoric acid, such as, for example, the addition of potassium ferro cyanide to remove iron and vanadium or the use of sodium silicate to remove fluorine, add substantially to the expense of manufacturing the crude acid.

SUMMARY OF THE INVENTION

The present invention is concerned with an economical method for purifying crude phosphoric acid produced by the wet process method. The method is utilized at the site of the acid manufacturer and does not add significantly to the cost of producing crude phosphoric acid. Crude phosphoric acid treated in accordance with the present invention is sufficiently pure, after treatment, to enable it to be shipped or stored for significant periods of time without any substantial sludge formation caused by the setting out of dispersed impurity particles.

To these ends the method of the present invention comprises intermittently contacting a portion of a filter element containing an overlying layer of diatomite filter cake with crude phosphoric acid maintained at a temperature between about 57° C. and about 77° C. while maintaining reduced pressure on the side of the filter element opposite the filter cake. A substantial portion of the dispersed solid impurities are retained in the outer portion of the filter cake and a substantial portion of the fluorine in the crude phosphoric acid undergoes an in situ reaction with the siliceous portion of the diatomite and is likewise retained in the filter as a fluorosilicate. Following contact with the crude phosphoric acid, the outer portion of the filter cake is removed to expose a fresh filtering surface for subsequent acid contact. The removed portion of the filter cake contains a major portion of the solid impurities removed by the filtration of the acid. These retained solids contain a substantial phosphate content of which a major portion can be recovered by slurrying the removed portion of the filter cake and reintroducing the slurry into the acid manufacturing process.

Other aspects and advantages of this invention will become apparent from the following detailed description taken in conjunction with the accompanying drawings.

BRIEF DESCRIPTION OF THE DRAWING

The FIGURE is a flow diagram of a process for treating crude wet process phosphoric acid in accordance with the present invention.

DETAILED DESCRIPTION OF THE INVENTION

The present invention is embodied in a process for removing suspended solid impurities from crude wet process phosphoric acid. In accordance with the present invention, the crude phosphoric acid hereinafter referred to as feed acid, is preheated and vacuum filtered through a diatomite filter cake to substantially reduce the quantities of suspended solid impurities contained in the feed acid. Preferably the preheating and filtering steps are preceded by an aging and settling operation for removing the heavier, more easily settled impurities prior to the filtration step.

Feed acid produced by the process includes substantial proportions of impurities such as for example fluorine; calcium, determined as CaO; sodium, determined as $Na_2O$; $SiO_2$; $SO_4$; iron, determined as $Fe_2O_3$; aluminum, determined as $Al_2O_3$; and magnesium determined as MgO. The relative proportions of impurities contained in the feed acid are largely determined by the type of wet processing utilized to produce the feed acid and the nature of the phosphate bearing rock from which the feed acid is produced. Sufficient proportions of the impurities remain in the feed acid oven after aging and settling and after a substantial period of time, separate from the acid in the form of a sludge. It is commercially impractical to hold the feed acid sufficiently long enough to allow the formation and separation of the sludge and consequently the sludge is normally encountered at the user's location, often resulting in rejection of the acid.

In the present invention, it has been found that by preheating the feed acid, followed by vacuum filtration through a filter medium including a diatomite cake, the sludge forming impurities can be removed in sufficient quantity to substantially eliminate the subsequent formation of sludge during shipping and handling of the phosphoric acid product.

Due to the nature of the dispersed impurities, the filtration of the crude phosphoric acid has been, prior to this invention, considered impractical from a commercial standpoint due to the fact that the sludge forming impurities quickly blind the filter surface resulting in high head pressures and low filtration rates.

In accordance with this invention, the feed acid is preheated to a temperature of between about 57° C. and about 77° C. as it has been determined that feed acid temperature is the primary variable affecting filtration characteristics of the crude phosphoric acid. It has been found that below about 57° C. the rate of filtration is undesirably low while about 77° C. excessive fluorine fumes, as $SiF_4$, are evolved. The preferred feed acid temperature has been found to be between 70° C. and about 71° C.

In the filtering operation, vacuum filtration is highly preferred in the present invention. Filtering is carried out through a diatomite precoat and the filtering is defined herein as intermittent. That is to say, that because the impurities removed from the acid rapidly clog or blind a filter surface, the filtering process is interrupted at frequent intervals to remove the outer portion of the diatomite precoat which contains the impurities, thereupon exposing a fresh filter surface for subsequent filtering operation. The filter design which lends itself most readily to this type of filtration is the vacuum rotary drum filter. Vacuum rotary drum filters are well known in the art and do not per se form a part of the present invention. The rotary drum filter is highly preferred, however, for use in the present invention since its operation particularly lends itself to intermittent filtering contact between the acid and the filter medium and the filter is easily adapted to carry a doctor knife for controllably removing an impurity containing portion of the filter cake to expose a fresh filtering surface for subsequent filtering contact with the acid.

It should be clear that the intermittent filtering step of the present invention is not restricted to rotary drum filters. Thus, for example, the filtering step may be conducted in a batchwise manner through a table filter or through a vacuum leaf filter with filtration interrupted when the pressure rises to a selected level. A portion of or all of the filter cake is removed upon completion of each of the filtering steps and a fresh filtering surface prepared.

The filter medium utilized in the process of the present invention is diatomite which is prepared as a slurry and placed as a cake over a porous support medium. The particle size of the diatomite does not influence to any significant degree the purity of the final product acid although it does influence the filtration rate, with coarser grade diatomite exhibiting the higher filtration rate.

In the preferred embodiment of the present invention utilizing a rotary drum filter best results are obtained using the so-called coarse grade diatomite having a screen analysis of 95%+325 mesh, 50%+150 mesh, 8%+60% mesh and trace amounts +28 mesh. The screen analysis is based upon the United States Standard Sieve Series. In addition it is preferred to incorporate cellulose fibers in the diatomite in proportions of 1 part cellulose fiber to 10 parts diatomite on a weight/weight basis.

In addition to the filtration of suspended solid particles from the crude phosphoric acid, it has been found that there is a surprising reduction in the fluorine content of the acid after filtration as compared with the fluorine content prior to filtration. It is believed that the fluorine contained in the acid undergoes an in situ reaction with the silica of the diatomite to form fluorosilicates which are retained in the diatomite filter cake.

Referring to the FIGURE, a flow diagram for purifying crude phosphoric acid by vacuum filtration in accordance with the preferred form of the present invention is illustrated. An aging tank 11 provided with an impeller 12 communicates with a source of crude phosphoric acid by means of line 13. Transfer pump 14 and line 15 connect the aging tank with a settling tank 16 which is provided with a rake 17 for the removal of solids through line 18 in the bottom of the settling tank. Line 20 and feed pump 19 are provided to move settled acid to a jacketed preheater 21 for heating the acid to the desired filtering temperature. The preheater 21 is connected to a source of steam at line 22 and a condensate line 23 for leading steam and condensed water out of the preheater. Heated acid is introduced through lines 24 and 24a to a rotary drum filter, indicated generally as 25, which is provided with a rotary drum 26 and a filter tank 27 through which the rotary drum rotates. The level of acid in the filter tank 27 is sensed by a level control sensor which controls a lever control valve 29 in line 24a to maintain the proper flow of heated acid from the preheater 21 to the filter tank. A reduced pressure is maintained within the rotary drum 26, by means of a vacuum pump 30 which communicates with the rotary drum interior through a line 31, a condenser 32, a line 33, a receiver 34, and a line 35. The rotary drum filter 25 is provided with a doctor blade 36 which is mounted for advancement in response to the rotation of the drum for controllably removing a portion of the diatomite filter cake. The removed filter cake is washed along a trough 37 into a cake slurry tank provided with an agitator 40 by water introduced through a line 38. The removed portion of the filter cake, after slurrying, is conveyed through a line 41 by pump 42 for subsequent filtration and return of the filtrate to the manufacturing process for recovery of a substantial portion of the phosphate values retained in the filter cake.

The filtered acid under vacuum is led into the receiver 34 by the line 35 where vapors are separated from the liquid product acid, which is discharged from the receiver through a line 43, a pump 44 and a line 45 to suitable receiving tanks, not shown, for shipment or further processing. A valve 46 is provided to close the line 45 and a flow recorder 47 records the quantity of product acid through the line 45.

The scrubber 32 is provided with a source of scrubbing water through a valve 48 and a line 49 and receives the gaseous materials from the receiver 34 through the line 33. The scrubber liquid is discharged through a line 50 to a seal tank 51 and discharged through a line 52. Uncondensable gases pass through the line 31 and are vented at 53.

A precoat slurry tank 60 provided with an agitator 61 is interconnected to the line 24 by a line 62 by means of a three position valve 59. A pump 63 is provided for moving the slurry from the precoat slurry tank 60 to the filter tank 27. Diatomite and water are introduced into the slurry tank 60 through lines 64 and 65 respectively. A line 66, provided with a valve 67, communicates between the slurry tank 60 and the line 45. During the preparation of the precoat, the valve 59 is moved to a position closing off the line 24 and permitting communication between line 62 and the line 24a for the introducing of slurry to the rotary filter 25. The valve 46 is closed and the valve 67 opened so that slurry water and fine diatomite are returned to the slurry tank through the line 35, the receiver 34, the line 43, the line 45 and the line 66.

Although not specifically noted, all pumps, impellers and the like illustrated herein are driven by suitable electric motors.

The following example illustrates a preferred method for purifying crude phosphoric acid produced by the wet process in accordance with this invention.

EXAMPLE

A precoat slurry consisting of one pound of coarse diatomite (including 1 part cellulose fibers per 10 parts of diatomite) to one gallon water was prepared in the slurry tank 60. Diatomite slurry was pumped by the pump 63 through the line 62 and line 24a to the filter tank 27 of the rotary filter 25 to form a filter cake on the drum 26. The vacuum pump 30 was operated to draw a reduced pressure of 20 inches of mercury at the interior of the porous drum 26. The drum 26 was rotated in a counterclockwise direction and a filter cake of approximately two to three inches in thickness was deposited on the outer surface of the porous drum. Following preparation of the filter cake the remaining slurry in the filter tank 27 was flushed out and the doctor blade 36 was set to advance a distance of about 0.005 inches per drum revolution. The valves 59 and 67 were closed and the valve 59 moved to a position for closing line 62 and for providing communication between the lines 24 and 24a. Valve 46 was also opened in preparation for filtering acid.

The feed acid was manufactured from North Florida phosphate rock in a Dorr-Oliver plant with a continuous, circular reactor. The feed acid was concentrated in a forced circulation evaporator to a phosphate content of about 50% and was lead directly from the evaporator through the line 13 into the aging tank 11 where it was held with agitation for a period of 24 to 48 hours. During this period, the acid was cooled from its manufacturing temperature of 74° C. to about 54° C. The aged feed acid was then transferred through the line 15 by pump 14 to the settling tank 16 where it was held an additional 24 hours to allow the heavier solid particles to settle out.

Following the settling step, the acid was pumped from the settling tank 16 passing first through the preheater 21 where it was heated to a temperature between 70° and 71° C. and then to the filter tank 27 of the rotary drum filter 25.

A vacuum of about 25 inches of mercury was drawn in the interior of the drum 26 by the vacuum pump 30, drawing the acid through the diatomite filter cake where impurities were removed, with the filtered acid being collected and moved to the receiver 34 through the line 33 where the gaseous and liquid components were separated as described above. The drum rotation was maintained at 1 rpm and upon each rotation of the drum the doctor blade 36 was advanced to remove the outer portion of the filter cake. The removed outer portion of the filter cake was collected in the cake slurry tank. 39.

The collected portion of the filter cake in the cake slurry tank 39 were maintained with constant agitation until sufficient quantity was collected for filtration through a gypsum filter located in the phosphoric acid plant. Analysis of the filtrate indicated that 85% of the phosphate content in the removed portions of the filter cake were recovered in the filtrate which was returned to the phosphoric acid plant for reprocessing.

A typical analysis of the phosphoric acid before and after filtering in accordance with the present invention is set forth in Table A below.

TABLE A

| | Typical Analysis Crude Phosphoric Acid - Percent by Weight | |
|---|---|---|
| Analysis | Before Filtering | After Filtering |
| $P_2O_5$ | 48.55% | 49.87% |
| Total Solids | 6.20% | 0.50% |
| F | 2.08% | 0.70% |
| CaO | 1.20% | 0.07% |
| $Na_2O$ | 0.35% | 0.10% |
| $SiO_2$ | 0.15% | 0.20% |
| $SO_4$ | 4.55% | 3.25% |
| $Fe_2O_3$ | 1.34% | 0.92% |
| $Al_2O_3$ | 1.50% | 1.16% |
| MgO | 0.68% | 0.27% |

From the foregoing analysis it can be seen that a substantial purification of the acid was obtained after treatment in accordance with the present invention. In particular the solids were substantially reduced to a level below that which is normally obtained when the product is centrifuged or otherwise treated to remove solids.

The filtered product is substantially more stable with regard to the formation of sludge and the reduction in fluorine content is of great advantage, particularly when the acid is to be used for other than fertilizer production.

In subsequent filtration runs utilizing crude phosphoric acid having solids contents as low as 2%, no substantial difference in filtration rate or in product quality was noted. It is within the scope of the present invention, therefore, to filter crude phosphoric acid directly from the manufacturing process, eliminating the aging and settling steps.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiment shown and described but is to be interpreted as broadly as permitted by the appended claims.

I claim:

1. A method for removing impurities from wet-process produced phosphoric acid and recovering values retained by the impurities comprising the steps of:

forming a filter cake comprising diatomite on a surface of a porous medium;

maintaining wet-process produced phosphoric acid containing particulate impurities at a temperature of from about 57° C. to about 77° C;

filtering such phosphoric acid through the formed filter cake for removing particulate impurities from such phosphoric acid whereby such removed particulate impurities and phosphate values are retained by the filter cake;

simultaneously with filtering such phosphoric acid, continuously removing an impurity-containing upper portion of the filter cake to expose to the wet-process phosphoric acid a fresh surface of the filter cake;

forming an aqueous slurry of said removed portion of said filter cake; and filtering said slurry to recover a filtrate containing a major portion of the phosphate values retained by the filter cake for reprocessing.

2. The method of claim 1 wherein said filter cake is formed over the outer surface of a porous cylinder and said cylinder is rotated during filtration so that a portion of said outer surface is intermittently contacted by said acid for the filtration thereof followed by contact with blade means for removing said impurity-containing outer portion of said filter cake.

3. The method of claim 2 wherein said cylinder is rotated at the rate of 1 revolution per minute.

4. The method of claim 2 wherein said blade means is advanced about 0.005 inches per revolution.

5. The method as defined in claim 1 wherein said acid is maintained at a temperature between about 70° C. and about 71° C.

6. The method of claim 1 wherein the wet-process phosphoric acid contains about 50% by weight $P_2O_5$.

7. In the wet process for producing phosphoric acid by the acidulation of phosphorus-bearing rock with sulfuric acid thereby to precipitate calcium sulfate and to release crude phosphoric acid containing sludge forming impurities and thereafter concentrating said crude impurity-containing phosphoric acid to a phosphate content of about 50% $F_2O_5$ by weight, the improvement comprising the steps of:

heating said concentrated acid to a temperature of between 57° C. and about 77° C.;

forming a filter element consisting of a diatomite filter cake coat overlying the surface of a porous support member;

intermittently contacting at least a portion of said filter element with said acid while maintaining reduced pressure on a side of said filter element opposite said filter cake thereby filtering said acid to remove at least a portion of the sludge forming impurities from said acid, cake, said filter cake impurities being retained in an outer portion of said filter cake retaining phosphate values;

collecting said acid after filtration;

removing said impurity-containing portion of said filter cake after contact thereof by said acid, thereby to present fresh filter surface for subsequent acid contact;

collecting said removed outer portion of said diatomite coat;

forming a water slurry of said collected removed outer portion;

filtering said slurry, thereby yielding a filtrate containing a major portion of the phosphate values retained by the filter cake; and returning the filtrate to a phosphoric acid plant for reprocessing.

8. The process as defined in claim 7 wherein said acid is heated to a temperature between about 70° C. and about 71° C.

9. The process as defined in claim 7 wherein said diatomite coat is formed over the outer surface of a porous cylinder and said cylinder is rotated so that a portion of said coated outer surface is contacted by said acid for the filtration thereof followed by contact with blade means for removing said impurity-containing outer portion of said diatomite coat.

10. The process as defined in claim 7 wherein said cylinder is rotated at the rate of one revolution per minute.

11. The process as defined in claim 7 wherein said blade means is advanced about 0.005 inches per revolution.

12. A method for removing impurities from wet-process produced phosphoric acid and recovering values retained by the impurities comprising the steps of:

maintaining wet-process produced phosphoric acid containing particulate impurities at a temperature of from about 57° C. to about 77° C.;

filtering such phosphoric acid for removing particulate impurities from such phosphoric acid, said removed particulate impurities retaining phosphate values;

forming an aqueous slurry of removed particulate impurities; and filtering said slurry to recover a filtrate containing a major portion of the phosphate values retained by the particulate impurities for reprocessing.

13. The method as defined in claim 12 wherein said acid is maintained at temperature between about 70° C. and about 71° C.

* * * * *

UNITED STATES PATENT AND TRADEMARK OFFICE
CERTIFICATE OF CORRECTION

PATENT NO. : 4,235,854

DATED : November 25, 1980

INVENTOR(S) : Hudson C. Smith; Wesley W. Atwood; and John S. Myrick

It is certified that error appears in the above—identified patent and that said Letters Patent is hereby corrected as shown below:

Column 1, line 32, change "setting" to -- settling --.
Column 1, line 62, change "setting" to -- settling --.
Column 2, line 51, change "oven" to -- even --.
Column 5, line 35, change "lead" to -- led --.
Column 5, line 61, change "portion" to -- portions --.
Column 7, line 28, change "$F_2O_5$" to -- $P_2O_5$ --.

Column 7, line 41, delete the words "cake," and "filter cake".
Column 7, line 43, after "cake" insert -- , said filter cake --.

Signed and Sealed this

Thirty-first Day of March 1981

[SEAL]

Attest:

RENE D. TEGTMEYER

Attesting Officer   Acting Commissioner of Patents and Trademarks